US007172115B2

(12) United States Patent
Lauden

(10) Patent No.: US 7,172,115 B2
(45) Date of Patent: Feb. 6, 2007

(54) BIOMETRIC IDENTIFICATION SYSTEM

(75) Inventor: Gary A. Lauden, McKinney, TX (US)

(73) Assignee: Riptide Systems, Inc., McKinney, TX (US)

( * ) Notice: Subject to any disclaimer, the term of this patent is extended or adjusted under 35 U.S.C. 154(b) by 0 days.

(21) Appl. No.: 11/096,073

(22) Filed: Mar. 31, 2005

(65) Prior Publication Data

US 2005/0218215 A1 Oct. 6, 2005

Related U.S. Application Data

(60) Provisional application No. 60/558,915, filed on Apr. 2, 2004.

(51) Int. Cl.
*G06K 5/00* (2006.01)

(52) U.S. Cl. ...................................................... 235/380

(58) Field of Classification Search ..................... None
See application file for complete search history.

(56) References Cited

U.S. PATENT DOCUMENTS 5,534,857 A 7/1996 Laing et al.
6,219,439 B1 4/2001 Burger
6,690,673 B1 2/2004 Jarvis
6,698,653 B1 3/2004 Diamond et al.
6,920,567 B1 * 7/2005 Doherty et al. ............... 726/22

(Continued)

FOREIGN PATENT DOCUMENTS

WO WO 2005/008559 A2 1/2005

OTHER PUBLICATIONS

TI Enters Access Control Market, RFID Journal, Aug. 1, 2002.

(Continued)

*Primary Examiner*—Jared J. Fureman
*Assistant Examiner*—Tae W. Kim
(74) *Attorney, Agent, or Firm*—Patton Boggs LLP

(57) ABSTRACT

A biometric identification system that includes one or more identification devices or cards. Each identification card includes a radio frequency identification (RFID) element storing a first set of biometric information. A communication device operates to send and receive radio frequency signals to read the first set of biometric information from the identification device when they are proximal to each other but without insertion or physical contact. A biometric reader is provided that reads a second set of biometric information from an individual presenting the identification card. A comparison mechanism compares the first and second sets of biometric information to determine if the two sets are a match. When no match is found, a flag mechanism modifies a value of a flag in the RFID element of the identification device. An update mechanism determines when the match exceeds an accuracy limit and updates biometric information on the identification device wirelessly.

24 Claims, 5 Drawing Sheets

U.S. PATENT DOCUMENTS

| | | | | |
|---|---|---|---|---|
| 2002/0149467 | A1 | 10/2002 | Calvesio et al. | |
| 2002/0167394 | A1 | 11/2002 | Couillard | |
| 2002/0180584 | A1* | 12/2002 | McGregor et al. | 340/5.26 |
| 2003/0028814 | A1* | 2/2003 | Carta et al. | 713/202 |
| 2003/0220876 | A1* | 11/2003 | Burger et al. | 705/50 |
| 2004/0049401 | A1 | 3/2004 | Carr et al. | |
| 2004/0049451 | A1 | 3/2004 | Berardi et al. | |
| 2004/0100363 | A1* | 5/2004 | Lane et al. | 340/5.86 |
| 2004/0179718 | A1 | 9/2004 | Chou | |
| 2004/0205350 | A1 | 10/2004 | Waterhouse et al. | |
| 2004/0230488 | A1 | 11/2004 | Beenau et al. | |
| 2004/0252013 | A1 | 12/2004 | Fuks et al. | |
| 2004/0257197 | A1* | 12/2004 | Beenau et al. | 340/5.53 |
| 2005/0001712 | A1 | 1/2005 | Yarbrough | |
| 2005/0005172 | A1 | 1/2005 | Haala | |
| 2005/0033688 | A1 | 2/2005 | Peart et al. | |
| 2005/0038741 | A1 | 2/2005 | Bonalle et al. | |
| 2005/0039027 | A1* | 2/2005 | Shapiro | 713/186 |
| 2005/0235148 | A1* | 10/2005 | Scheidt et al. | 713/168 |

OTHER PUBLICATIONS

HID IR Offer Biometric Smart Card, RFID Journal, Sep. 16, 2002.

Texas Instruments RFId Systems, Plastic Card Systems, Inc., And ITC Systems Join Fargo Technology Alliance, Business Wire, Sep. 9, 2002.

Extended "Read Range" of AXCESS Inc.'s New Identity Card Promises Into Work and Shorter Security Lines, Business Wire, Mar. 4, 2003.

RFID in Japan Crossing the Chasm, via Asahi.com, Jan. 18, 2005.

* cited by examiner

BIOMETRIC IDENTIFICATION SYSTEM

CROSS REFERENCE TO RELATED APPLICATIONS

This application claims the benefit of U.S. Provisional Application No. 60/558,915, filed Apr. 2, 2004, which is incorporated herein in its entirety.

BACKGROUND OF THE INVENTION

1. Field of the Invention

The present invention relates, in general, to biometric identification, and more particularly to an interactive radio frequency (RF) biometric identification system, and corresponding methods, that includes an identification device (e.g., a card, fob, tag, band, or the like) that may be carried, worn or embedded on/in the bearer's person. The RF-based device stores and transmits multiple-protocol capable, encrypted, encoded binary biometric data (e.g., fingerprints, voice prints, iris scan data, retina scan data, hand prints, or other biometric data) that uniquely identifies an individual or identifies an individual with a significant probability, which can be compared to locally collected biometric information in a front end portion of the system to verify the identity of the bearer of the device.

2. Relevant Background

The use of biometrics to enhance security is increasing rapidly in recent years. The term biometrics refers generally to the measurement of one or more a living trait or a personal characteristic of a person, such as a fingerprint, a voice print, an iris scan, or any other characteristic unique to the individual. These biometrics are more and more often being used to control access. For example, numerous technologies are being developed and implemented that interpret personal traits or biometric information for access control purposes in place of more easily fooled identification systems such as those based solely on entry of a password. Unfortunately, existing biometric-based security systems have not provided the high levels of accuracy and ease of use that is demanded by users of such systems.

In some existing biometric secure access systems, an individual, such as a potential user of a computer device or a person desiring access to a financial account or access to a secure room or facility, may provide a biometric finger print to a reader device to be compared against data on a smart card that also be inserted into the device. This type of system requires the user to enter his user ID and password and provide his finger for a finger print scanner. The image of the finger print is then transmitted to the server along with a scanned image of the finger that was placed on the scanner and verified to be a match. If there is a match, the log on process will proceed as normal with the validation of the user ID and password. However, the information is still being communicated to a server and therefore, the potential for compromising system security is increased. Since these readers provide no first level authentication prior to sending data, there is an increased potential for security risk to the system as the transmitted data may be intercepted.

The systems described above are sometimes labeled "polling-type systems" because they continuously monitor insertion-type card readers to see if an identity card has been inserted. The constant querying of the readers requires a significant amount of computer and mechanical support and typically requires a significant amount of central processing unit (CPU) time and physical memory in order for the system to properly function. In today's corporate world, a security system server that communicates with tens or perhaps hundreds of readers, requires a significant overhead, which is why systems available now often use a dedicated device for these functions. As will be appreciated in the example of biometrics being used to provide secure access to a computing device, the "secured" device which has an insertion-based reader attached will not be able to provide valuable CPU cycles and memory to user applications while the biometric access methods continually are asking or polling the reader to determined if a smart card is inserted and is the proper smart card.

The amount of data that must be processed by existing systems further limits their effectiveness and utility. For example, the insertion-based system described above compares input data for identification against data from perhaps a large number individuals' biometric data or information. The systems also must transmit information, whether by wire or wirelessly, to remote locations which permits unauthorized access to or theft of the information that is transmitted or received. For example, a hacker or unauthorized person could try to defeat or compromise an ID card by providing a "look-alike" reader, such as at an automatic teller implementation. A cardholder then inserts his card into this fake reader. If communication is allowed to the reader prior to authentication, the hacker could then attempt to read from or "pull" information from the card, such as in this example, the card holder's fingerprint template, this live scan of their fingerprint, their bank account(s) numbers, as well as all other confidential information on the card.

Hence, there remains a need for improved methods and systems for utilizing biometric information for identification verification purposes in security systems, such as systems used to control access to facilities, to use of devices, to accounts, to physical facilities, and the like.

SUMMARY OF THE INVENTION

The present invention addresses the above and other problems by providing a radio frequency (RF) biometric identification systems and corresponding methods that does not require insertion of a device or card but instead is based on RF identification technologies that only require that an identification device, such as an ID card, be in proximity to an authentication device for identification to be validated.

More particularly, a biometric identification system is provided that includes one or more identification devices or cards that each include a radio frequency identification (RFID) element (such as a chip or tag) that stores a first set of biometric information. The system further includes an identification system that utilizes a communication device which operates to send and receive RF signals to read the first set of biometric information from the identification device when they are proximal to each other but without insertion or physical contact. The identification system further includes a biometric reader that reads a second set of biometric information from a person or individual such as with a scanner.

The identification system also includes a comparison mechanism that compares the first and second sets of biometric information to determine if the two sets are a match. When no match is found, the identification system operates to modify a value of a flag in the RFID element of the identification device, such as by incrementing an unauthorized use flag value and in some embodiments, the comparison mechanism first compares the flag value to a preset flag limit prior to performing the comparison of the biometric information sets. The identification system may also include an update mechanism operable to determine when the match between the first set of biometric information and the second set of biometric information is outside a predefined match accuracy limit and to update the first set of biometric information by writing the second set of biometric information to the RFID element via radio frequency signals sent by the communication device.

BRIEF DESCRIPTION OF THE DRAWINGS

FIG. 5 illustrates yet another embodiment of a biometric identification system of the present invention which illustrates the linking of a RFBID system with non-biometric access control devices or other RFID readers and the like.

DETAILED DESCRIPTION OF THE PREFERRED EMBODIMENTS

Figure 1:
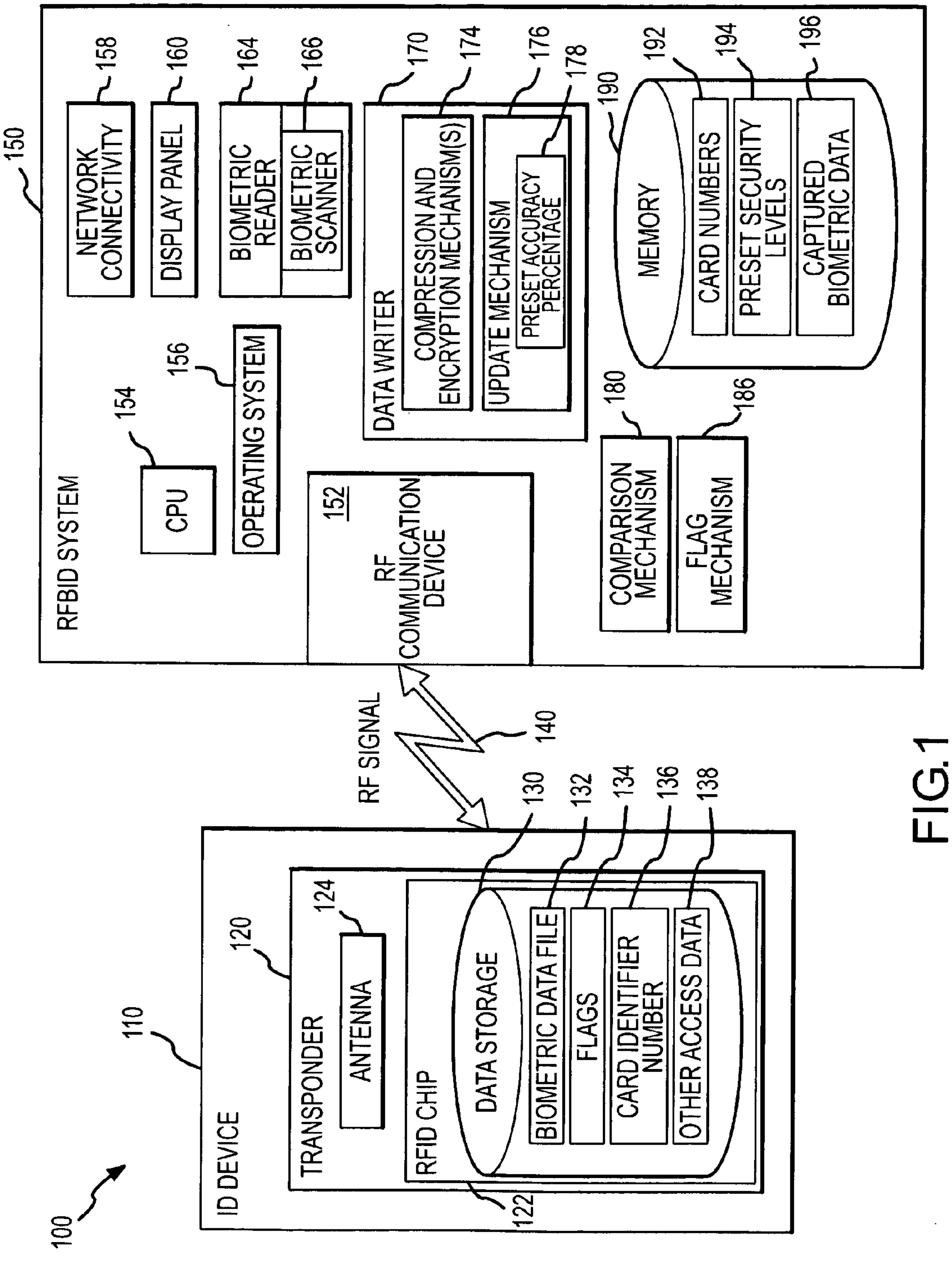
FIG. 1 illustrates a biometric identification system or network adapted for activating an ID device or card and for processing the ID device and a device bearer's biometric data to verify the bearer is the authorized or original person to whom the ID device was assigned.

In brief, the present invention is directed to a biometric identification system and corresponding methods for providing a deterrent to unauthorized, fraudulent, and/or illegal use of another individual's identity. The biometric identification system utilizes radio frequency (RF) biometric identification techniques including an identify card or other ID device that includes a tag (i.e., an RFID tag) on which an individual's biometric data is written, such as in a compressed and encrypted form. The biometric identification system uses the individual's biometric data on the ID device to positively confirm or deny that an individual presenting the ID device is the individual represented by the biometric data written to the RFID tag. The system is configured with an RF communication device that does not require insertion of the ID device and with a biometric reader to scan biometric data from the ID device bearer or holder. The system includes hardware and software devices to perform a comparison of the read biometric data and the biometric data from received from the ID device to determine if there is a match.

In this manner, RFID technology is used in the biometric identification system of the present invention to provide a connectionless process in which data can be written or read at distances of less than one inch to distances up to one hundred feet or more, depending on the class of the identification device (e.g., transponder on the device), the size of an included identification device antenna, and the power of the identification device (or RF tag on the device). An encrypted, compressed binary coded data file (in preferred embodiments, not an image) of an individual's biometric data is written to a ID device or to the RF-based tag on or embedded in the ID device. For example, the biometric data may be encrypted using current encryption technique that use 128 bit encryption; however, the flexibility of the RFBID system of the present invention allows for implementing many other types of encryption techniques. It will become clear from the following discussion that the biometric identification system of the invention provide enabling systems and methods for providing rapid, highly reliable, repeatable identification processes to validate that the person presenting the Identification Device is the individual that was issued that identification Device. The system can be thought of as an interactive system that permits write many/read many capabilities without physical contact required between the identification device and the system (often labeled RFBID system in the following description). The connectionless relationship between the RFBID system and the identification device may be referred to as "Wirelessly" or wireless, meaning no physical connection, such as a cable, network, or insertion device is required.

In the following discussion, computer and network devices (or "elements"), such as the software and hardware devices within the systems 100, 300, 400, and 500, are described in relation to their function rather than as being limited to particular electronic devices and computer architectures and programming languages. To practice the invention, the computer and network devices or elements may be any devices useful for providing the described functions, including well-known data processing and communication devices and systems, such as servers, personal computers and computing devices including mobile computing and electronic devices with processing, memory, and input/output components running code or programs in any useful programming language, and devices configured to maintain and then transmit digital data over a wired or wireless communications network. Data storage systems and memory components are described herein generally and are intended to refer to nearly any device and media useful for storing digital data such as disk-based devices, their controllers or control systems, and any associated software. Data, including transmissions to and from the elements of the systems and among other components of the network/systems 100 typically is communicated in digital format following standard communication and transfer protocols, such as TCP/IP, HTTP, HTTPS, FTP, and the like, or IP or non-IP wireless communication protocols.

FIG. 1 illustrates a simplified biometric system 100 that is adapted according to one embodiment of the invention for providing non-insertion, proximity only reading and writing of biometric data to an identification device 110 from radio frequency biometric identification (RFBID) system 150. As shown, the system 100 includes an ID device 110 that would be issued to a person or individual (with only one device 110 being shown for simplicity) for use in controlling that person's access to a secure facility or to a financial account or other application for which secure access is desirable. The ID device 110 in some embodiments takes the form of a plastic card, such as a plastic card the size of a credit card or driver's license or other useful size, but the device 110 is not limited to a plastic device or to a particular size. The device 110 may be a separate physical device or be included as part of a larger article, such as embedded into another product or sewn into clothing or the like.

According to an important feature of the invention, the ID device 110 includes a transponder or tag 120 which includes an RFID chip 122, an antenna 124, and data storage 130 for storing an individual's biometric data file 132, security or access flag values 134, a unique identifier number 136 for the ID device or card 110, and other access data 138. The purpose of the transponder or tag 120 and its components will become clear from the following discussion.

The ID device is preferably a multi-protocol (such as ISO 14443, 15693, Class 0, 1, 2, etc.), self-contained, individually controlled device and supports processes in which an individual's biometric data 132 and programmable data flags 134 are interactively read and stored by the RFBID system 150. Using radio frequency technology and the RFBID program and protocol capability, the data flags 134 can be set or reset without requiring insertion or swiping of the identification device 110. RFID technology provided by the transponder 120 and RFBID system 150 provides a connectionless process in which data can be written or read at distances of less than one inch to distances up to one hundred feet or more, depending on the class of the identification device RFID chip 122, the size of the identification device antenna 124, and the power of the RFBID communication device 152. An encrypted, compressed binary coded data file 132 (and preferably not an image) of an individual's biometric data is written to an activated or ready-to-use ID device. Current encryption technique uses 128 bit encryption; however, the flexibility of the system 100 allows for implementing many other types of encryption techniques to encode the information in the biometric data file 132 and other portions of the data storage 130 of the RFID chip 122.

The biometric identification system 100 is shown to include an RFBID system 150 that functions to communicate via an RF signal 140 with an ID device 110 in proximity to the RFBID system 150. To this end, the RFBID system 150 includes an RF communication device 152. For example, the RF communication device 152 is used to write via RF signal 140 biometric data and flag values from the data writer 170 and flag mechanism 186 of the RFBID system 150 to the RFID chip 122 and to also read the information in the data storage 130 from the RFID chip 122 for processing by the comparison mechanism 180.

Figure 3:
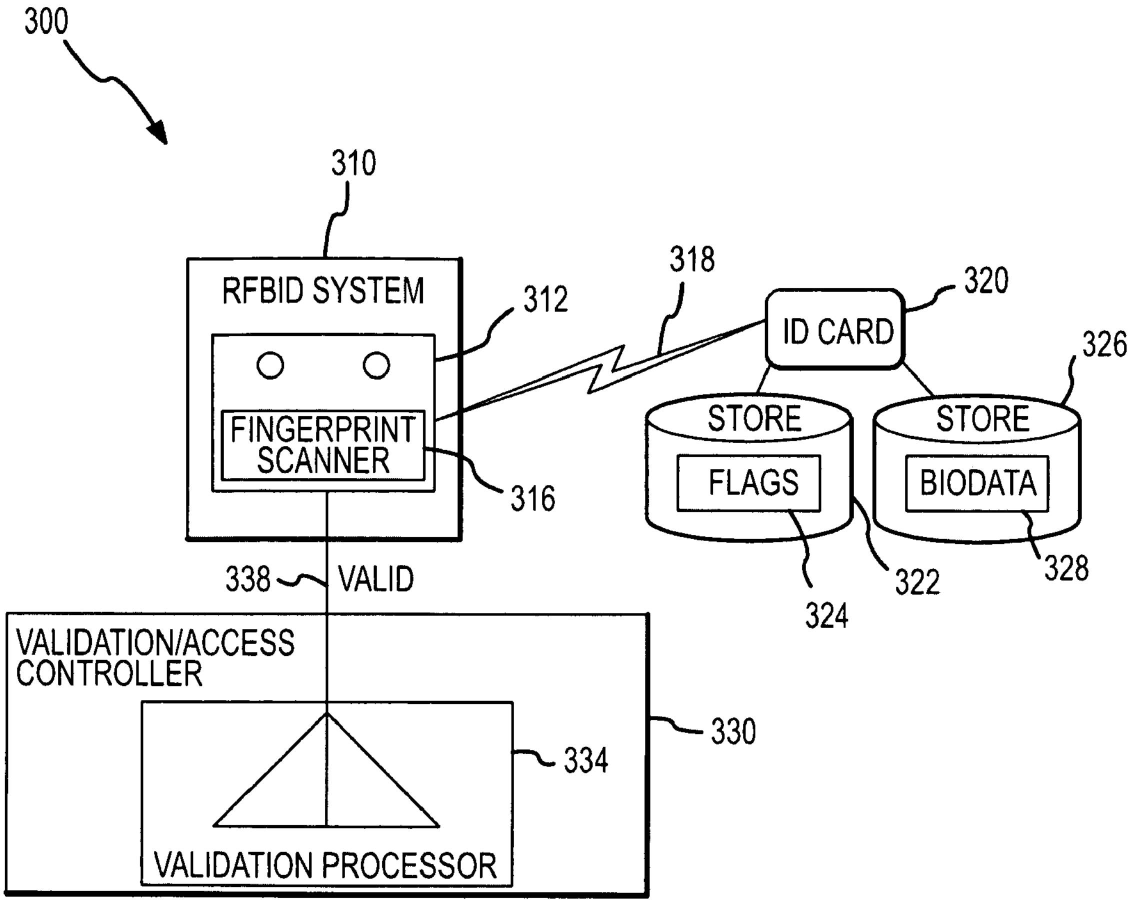
FIG. 3 illustrates a front end biometric identification system according to the present invention, which may utilize a RFBID system as shown in FIG. 1.

During operation, the RFBID system 150 is used to initialize ID devices 110 by writing an individual's biometric data to the data file 132 of the RFID chip 122. To this end, a biometric reader 164 is provided in the RFBID system 150 including a biometric scanner 166 for scanning or capturing biometric data, e.g., a fingerprint scanner, a voice print receiver, an iris scanner, a retina scanner, a scanner for hand prints, and the like separately or in combination. A data writer 170 with compression and encryption mechanisms 174 is also included to format the information captured by the biometric reader 164 for writing on the RFID chip 122 in the biometric data file 132. The write and read devices 170, 164 capture, compress, encrypt, and write an individual's biometric data to the individual's identification device 110. The RFBID system 150 provides a wide range of identity capabilities and can be used as a simple identity front-end system (such as merely confirming the identity of the individual presenting the identification device 110) as shown in FIG. 3 and/or the system may be used to provide a complete, standalone identity and access control system as shown in more detail in FIGS. 4 and 5

The RFBID system 150 components, such as the reader 164, data writer 170, and RF communication device 152 may be provided in separate physical components or as shown, as an integrated RFID and biometric device. The RFBID system provides for the logical detection and creation/initiation of ID device 110, which may be a card, fob, wristband, or the like. The biometric reader 164 is typically built into the RFBID system 150 and is designed to capture, with the biometric scanner 166, an individual's biometric data in a consistent manner to lessen the probability or possibility of misreads and incorrect identification, such as at RFBID identity reader locations (see, also, the systems 300, 400, 500 of FIGS. 3, 4, and 5). The RFBID system 150 includes an RF detector 152, a processor 154, an operating system 156, memory 190, and network connectivity 158 (e.g., wired and/or wireless interfaces and connections of a digital data communications network such as the Internet, a LAN, a WAN, or the like). A network connection 158 may be provided to allow additional parameters 138 to be set on the identification device 110, such as access rights to specific areas, number of attempts allowed, time of day/day of week permission, and the like that may be stored in memory 190 (see preset security levels 194) or written directly to the card at other access data 138. The size of the read/write capability within the ID device 110 may vary widely and the options for types and amounts of data 138 stored in the chip 122 may increase with changes/improvements in RFID technologies.

The RFBID system 150 includes a display panel 160 that in one embodiment includes colored light emitting diodes (LEDs) that are used by the comparison mechanism 180 and other portions of the RFBID system 150 via the CPU 154 to show the status of creation of the ID device 110 (e.g., Ready, Failure, and Done). Such an LED and/or other optional liquid crystal diode (LCD) or other display devices may be included in the display panel 160 to display other information such as whether a match is determined by the comparison mechanism 180 when the ID device 110 is later presented to the RFBID system 150 for confirmation of the identify of the bearer of the device 110.

The RFBID system 150 utilizes the CPU 154 and operating system 156 to run a set of RFBID software or applications to perform many of the functions of the system 150 and that are shown, at least partially, as "mechanisms" in the system 150. For example, the data writer 170 includes compression and encryption mechanisms 174 that include algorithms used to format the biometric data collected by the biometric reader 164 and to write the biometric data that is compressed and encrypted to the data file 132 of the RFID chip 122 via the RF communication device 152 and signal 140. Software associated with the RF communication device 152 (or other components) perform identification algorithms to process an RF signal from the ID device transponder 120 to detect the presence of the ID device 110. The compression and encryption mechanism 174 and update mechanism 176 (explained in more detail below) of the data writer 170 function to write data to the ID device 110. The comparison mechanism 180 functions with the RF communication device 152 to read data (such as that stored in data storage 130) from the ID device 110 and to perform biometric matching functions, e.g., by comparing the read data from the biometric data file 132 with near real-time biometric data 196 captured via the biometric reader 164.

The update mechanism 176, with a preset accuracy level or value 178, is provided to allow the biometric matching performed by the comparison mechanism 180 to be done with a data file 132 and data 196 that reflects the ability of the system 100 to learn an individual's biometric profile. More specifically, an individual's biometrics may change over time (e.g., a fingerprint may vary over time). The comparison mechanism 180 has the ability to detect minor variances in a particular biometric feature and to provide such a detected variance to the update mechanism 176. The update mechanism 176 acts to determine, such as by determining whether the detected variance exceeds or is "near" (i.e., within a set range or the like) the preset accuracy 178 (e.g., a preset accuracy percentage", whether an update is to be performed. When an update is determined by the update mechanism 176, the newly captured biometric information from the biometric reader is used to create an updated biometric profile of the biometric feature which is stored in the captured biometric data 196 of the RFBID system 150 and is also written to the RFID chip 122 of the ID device to overwrite the biometric data file 132. This real-time updating process does not require insertion or swiping of the ID device 110. A flag mechanism 186 is provided to determine if flag values exceed preset security levels 194 and to modify flag values 134 in the ID device 110 when a biometric match is not found by the comparison mechanism 180 (as will be explained more with reference to FIG. 2 with reference to FIG. 1).

In preferred embodiments, the ID device 110 is a passive RFID embedded transponder device (or document) and is typically the size and shape of a standard credit card but may be larger or smaller (and thicker or thinner). The device 110 includes an embedded RFID chip 122 that contains data storage 130 storing the encrypted, compressed binary file 132 generated by the RFBID system 150. Each card or device 110 typically also has a unique card identifier number 136 that is encoded in its data storage 130 and included in the RF signal 140 for comparison by the mechanism 180 with a set of registered card numbers 192, which allows further security as it limits opportunity for counterfeit cards to be utilized. The device 110 can be read by the RFBID system can be read via the RF signals 140 from a distance of less than one inch to a distance greater than a few feet or more depending on the type of transponder 120 embedded on the device 110. The RFBID system 150 generally uses passive RFID technology incorporated in the RF communication device 152 that does not require an embedded battery within the ID device 110. Such RFID technology is useful because it keeps costs for the device 110 low and the size of the ID device 110 small. Also, the ID device 110 is also configured in this manner to not be damaged or altered by magnetic influence. Further, the use of RFID technology for the ID device 110 and RFBID system 150 makes the system 100 independent of line of sight, which gives greater flexibility in which the ID device 110 can be read from and written to by the system 150.

Figure 2:
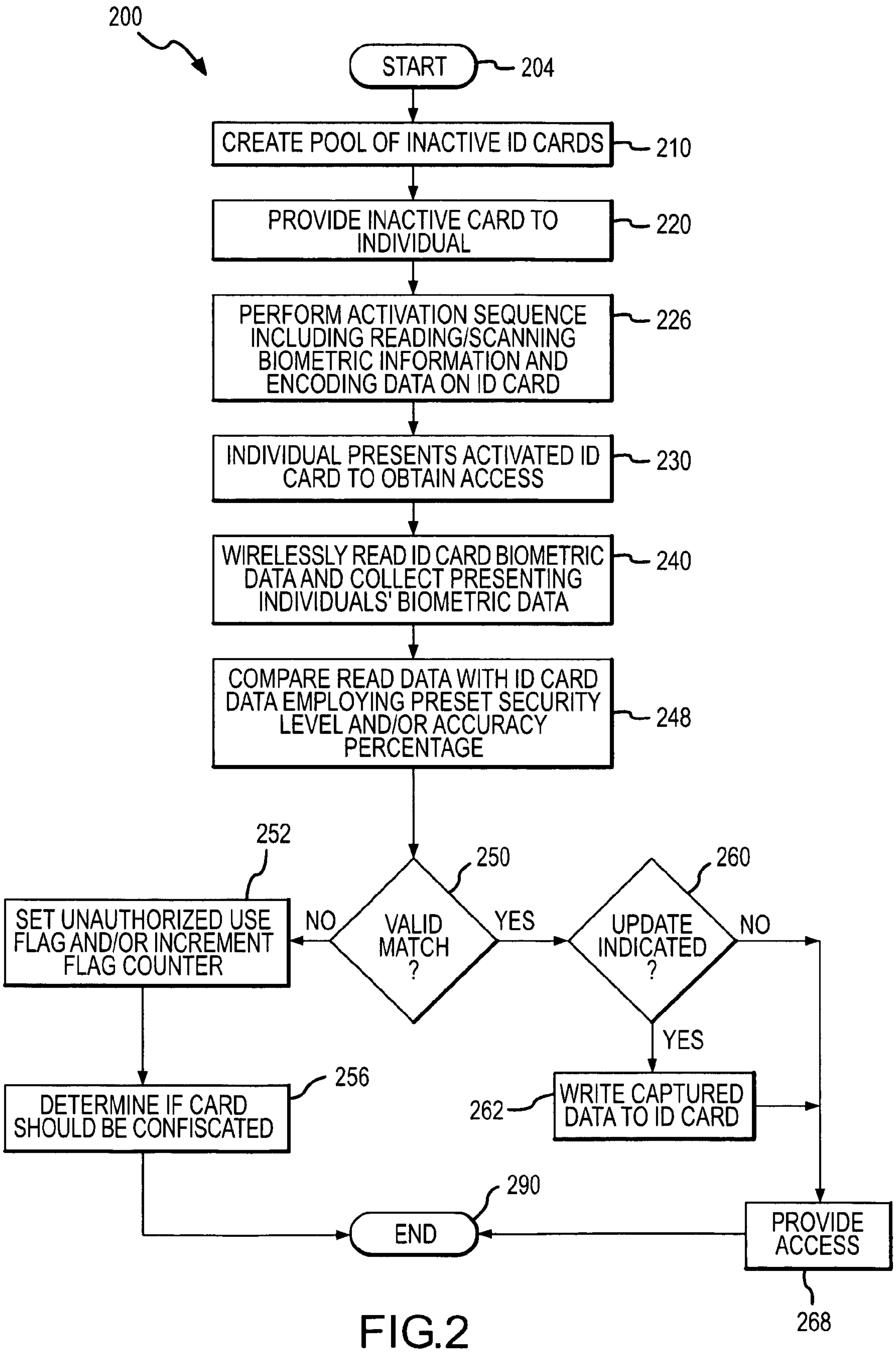
FIG. 2 illustrates a biometric identification process according to the present invention, such as may be carried out by operation of the system of FIG. 1.

FIG. 2 illustrates a biometric identification method 200 according to the present invention such as may be carried out by operation of the biometric identification system 100 of FIG. 1. The method 200 starts at 204 such as with the location of one or more RFBID systems 150 at locations in which access control is desired and locations in which distribution of new ID cards 110 is desired. At 204, the RFBID system 150 may be configured with the proper software applications and mechanisms, as discussed above, and with one or more biometric scanners 166 (i.e., one or more of the following: a fingerprint scanner, a handprint scanner, an eye-based scanner, or the like) for scanning an individual's biometric feature to capture biometric data 196. At 210, the method 200 continues with creating a pool of inactive ID cards or devices 110. In this step, a set of ID devices 110 are manufactured with RFID chips or transponder 120 embedded in or provided on the devices 110. At this point, each device 110 may be programmed or encoded with a unique identifier 136 (or this may be assigned during the activation sequence 226) and these card values 192 are stored in memory of the RFBID system 150.

At 220, an inactive ID card 110 is presented to a person or individual for whom a particular secure access is going to be granted (e.g., secure access to a facility, to the individual's financial accounts, or any other identity-based access based on biometric identification). At 226, the activation sequence is performed for the assigned ID card 110. During 226, the RFBID system 150 is operated to read/scan with the biometric reader 164 biometric information from the individual (e.g., bearer of the ID device 110), which is stored at 196 for use in later comparisons and which is encoded/encrypted by the data writer 170 and written to the data file 132 of the ID device 110. The biometric data that is originally collected and stored on the ID device 110 may be thought of as or labeled an individual's scan profile. After successful activation at 226, the ID card or device 110 contains at 132 in the RFID chip 122 the individual's biometric data or scan profile (for one or more selected features such as a fingerprint, handprint, retina scan, or other biometric feature).

At 230, the individual or bearer of the ID card 110 presents the activated ID card 110 to obtain some sort of secure access. At 240, the RFBID system 150 operates to detect the presence of the ID card within a detection range of the RF communication device 152 (such as less than 100 feet, less than 5 feet, less than 1 inch, or some other larger or smaller distance as determined by the ID device 110 and RFBID system 150 configuration). The RF communication device 152 reads the card identifier number 136 and the comparison mechanism 180 verifies the card 110 is a valid card from the pool of cards created in step 210 by comparing the read number 136 with card numbers 192. The RF communication device 152 also reads the biometric card data file 132 to obtain the scan profile stored on the ID device 110. Concurrently (or sequentially), the individual presents a biological feature for scanning by the biometric scanner 166 to collect or read the card bearer's "live" or current biometric information.

At 248, the comparison mechanism 180 acts to compare read or scanned biometric data with the scan profile from data file 132 of the device 110. The comparison mechanism 180 may retrieve a preset security level value 194 from memory 190, which may be a preset matching level required for a particular access or access point (e.g., 99 percent or higher matching levels may be required for higher security accesses while lower accuracy may be acceptable for other accesses such as 50 to 99 percent matching levels or other useful accuracy percentages) and these may be set per access point, based on the facility or account being accessed, or based on other criteria. At 250, the process 200 continues with determining if a valid match is obtained (such as one within the acceptable matching parameters that may be defined by the security levels 194).

If a match is not found by the comparison mechanism 180, the method 200 continues at 252 with the flag mechanism 186 acting to set unauthorized flag and/or incrementing the flag counter. Step 252 typically involves setting a flag value 134 in the transponder 120 by writing a new flag value to the device 110 or incrementing a counter. When a match is not obtained, the display panel 160 may be operated at 252 to show that access is prohibited (such as with a red LED being activated or lit). The use of flags is explained in more detail below. At 256, the method 200 continues with determining with the flag mechanism whether the card 110 should be confiscated, such as when the flag counter indicates that a preset number of invalid matches have been detected which would indicate that the bearer of the ID device 110 is not the person for whom the scan profile stored in the biometric data file 132 of the device 110 was previously created. At 290, the process 200 ends.

If a valid match is found at 250, then the method 200 continues at 260 with the update mechanism 176 determining whether an update of the scan profile in the data file 132 should be updated. Such a determination may be found warranted by the update mechanism 176 when the accuracy of the match found by the comparison mechanism 180 is within preset security levels 194 but near or outside preset accuracy levels 178 for the RFBID system 150. If the preset accuracy level 178 is reached or proximate, the method 200 continues at 262 with storing a new or updated scan profile in the data 196 of the RFBID system 150 and with writing the new or updated scan profile to the RFID chip or tag for encoding or storage in the biometric data file 132. The method continues at 268 with providing access based on the biometric identification match determined by the RFBID system 150 and the process ends at 290. When a match is obtained at 250, the step 260 may include operating the display panel 160 to show that a match is obtained and access is permitted (e.g., with a green LED being activated or lit).

The RFBID system of the present invention provides a wide range of identity capabilities including use as a simple identity front-end system such as confirming the identity of the individual presenting the ID device. An exemplary front-end system 300 is shown in FIG. 3 which uses a fingerprint as a representative (but not limiting) biometric feature. As shown, the system 300 includes an RFBID system 300 (which may be configured similarly to the system 150 of FIG. 1 or differently) with a hardware component 312 with a display device and including a fingerprint scanner 316. The RFBID system 310 communicates via RF signals 318 with an ID card 320 that includes a store or component 322 for storing flags 324 and a store 326 for storing biodata 328 (e.g., a biometric scan profile). The system 300 also may be configured for communication, wired or wireless, between the RFBID system 310 and a validation and/or access controller 330 that uses a validation processor 334 (such as a processor that uses any of a number or existing processes for validating the identity of a person based on a comparison between scanned biometric data and previously stored biometric data).

During operation, a person desiring access to a secure facility, account, or the like presents a previously activated ID card 320 to the RFBID system 310 (without insertion). The RFBID system 310 detects the presence of the ID card 320 and reads the fingerprint stored in the biodata 328 of the card 320 and also operates to read the fingerprint of the holder or presenter of the ID card 320 with the fingerprint scanner 316. The RFBID system 310 then determines whether there is a match between the fingerprint profile on the ID card 320 and the scanned/read fingerprint from the scanner 316. If a match is found, ID information from the fingerprint scanner 316 (and typically other information from the ID card 320 or such information may be sent separately once identify is initially confirmed by the RFBID system 310) is sent via signal/link 338 to the validation/access controller 330 for further processing by the validation processor 334. A mismatch determination by the RFBID system 310 will not result in information being sent to the validation/access controller 330, and in this manner, the RFBID system 310 acts as an effective front-end system for initially confirming the identity of an individual presenting an ID device 320 prior to further access processing being performed. In this system 300, the RFBID system 310 has no external dependencies for identity verification such as remote or centralized databases or network connectivity.

Figure 4:
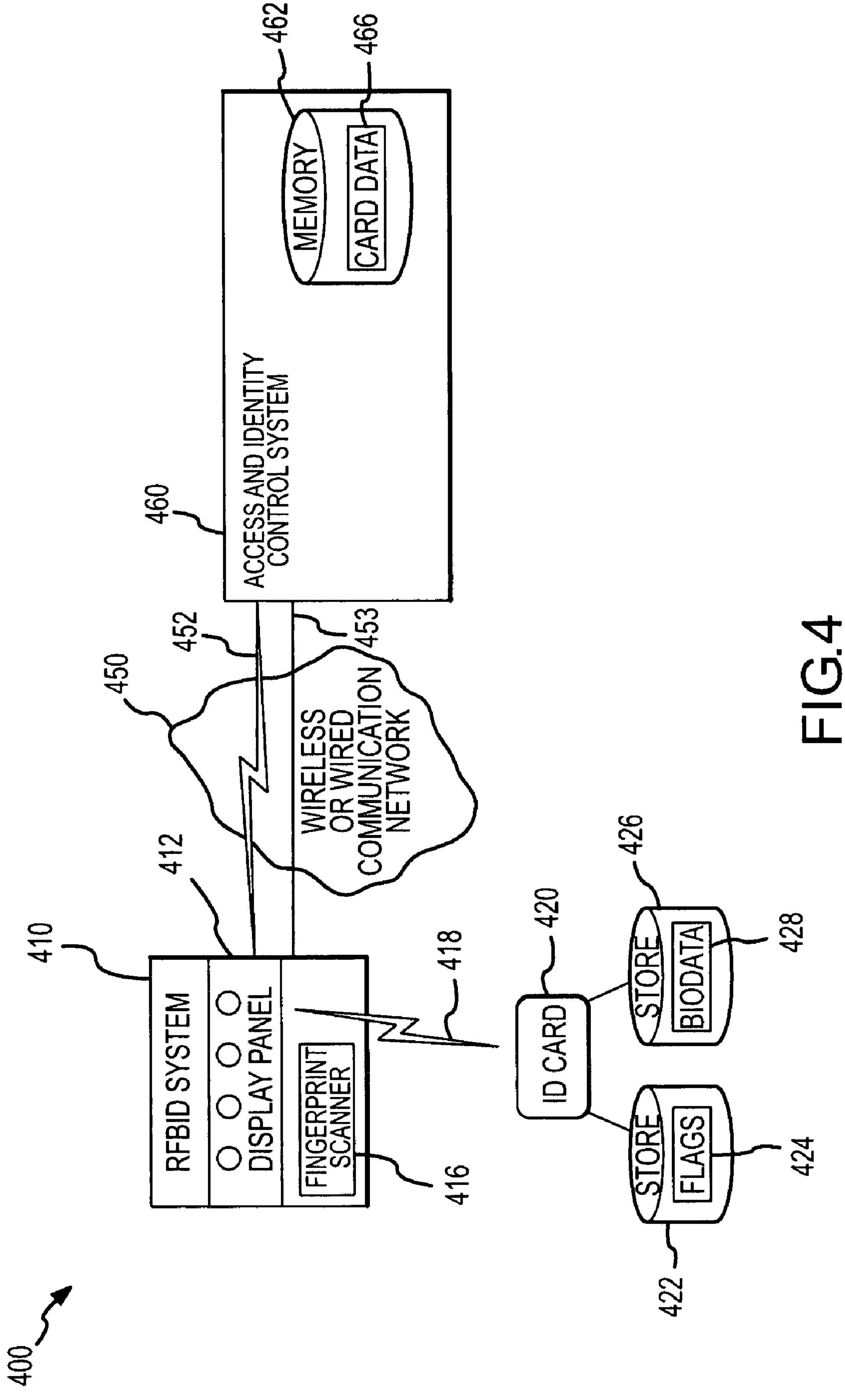
FIG. 4 shows another embodiment of a biometric identification system according to the present invention which utilizes a central database of card data.

In environments where more stringent control of capabilities is necessary, an RFBID system with the ability to interact with remote databases and system may be provided as shown in network or system 400 of FIG. 4. The RFBID system 410 again includes a display panel 412 and a fingerprint scanner 416 and is shown to be configured to interactively set or reset flags 424 in a store or encoded 422 on an ID card 420 wirelessly via RF signals 418 to the identification card 420. An example of this capability would be to flag an individual based upon a set of criteria that are being applied by a host system. Once the flag 424 is set, any usage of the identification device 420 at any RFBID system 410 location, regardless of network connectivity or access to a database, results in the RFBID system 410 being able to read the flag and cause appropriate action. In the system 400 of FIG. 4, the RFBID system 410 interacts with an access and identify control system 460 including a central database or memory 462 storing card data 466 via a wired or wireless network 450 via communication signals 452 and/or 453. As discussed with reference to FIGS. 1–3 , the RFBID system 410 also is able to read biodata 428 (such as a fingerprint) from a store 426 (or as encoded) on the ID card 420 via RF signals 418.

The following description provides further details of exemplary biometric identification systems including description of useful embodiments of RFBID systems and RFID devices or cards, such as those shown in FIGS. 1, 3, 4, and also 5. The RFBID system of the present invention is an interactive system. The identification device may be written to wirelessly (connectionless) an unlimited number of times. In one embodiment, the encrypted and compressed biometric data that is stored on the identification device accounts for approximately one-eighth of the identification device's total data storage capacity. This allows for a significant amount of storage availability for other functions defined by the application needs. As identification device capacity increases in the future, the RFBID system may be configured to adjust to increased storage capability without requiring changes to the biometric identification software.

RFBID systems of the invention have the ability to capture biometric data and embed the encrypted and compressed on identification devices based upon flags (e.g., Valid Identification Device Flag and Inactive Flag) being set. This capability reduces the need for training of personnel as the system has the necessary intelligence built in to it to perform a number of tasks that may otherwise require human intervention. The ID devices are intended to be kept under the control of specific, limited agencies, such as banks and secure facilities security departments. In many embodiments, the identification devices each have a unique identification number, and limited agencies or personnel have the ability to register these identification numbers in the RFBID system to prevent unauthorized usage. Examples of these agencies include, but are not limited to, the following: banks issuing debit and credit cards; airport security; airports issuing secure identity cards to flight crews, ground crews, baggage handlers, premium passengers, etc.; and secure facilities, such as nuclear power plants, oil refineries, water purification facilities, distributors of hazardous materials, hospitals, maternity wards, police and federal agencies where weapons are issued or seized property requires limited authorized access.

The RFBID system can include a device for reading the biometric data from the individual, software (or hardware, or a combination of hardware and software) for compressing and encrypting the data, and a writer for embedding the information onto a RFID device. Devices for reading biometric data, such as fingerprint data, and providing a binary file output are generally known; however, modifications may be made to a conventional device, such as providing a smaller and well-defined space for a finger to read a fingerprint if the area for detecting the fingerprint is larger than desired. The compressing and encrypting performed by the RFBID systems of the invention can use conventional approaches, including public/private key encryption. Writers are also generally known for writing data onto a RFID tag and may be incorporated into the RFBID system of the present invention to perform many of the data writing operations.

To create ID devices, RFID tags with (or for later storage of) the compressed and encrypted biometric data can be embedded into devices, such as wristbands, credit and debit cards, fobs, or government issued documents, such as employment ID devices, passports, visas, health records, and the like. The RFBID system or identity reader of the present invention can be widely distributed to any control point that requires positive identification of any individual attempting to gain access or perform specific transactions, such as cash withdrawals, charges to bank accounts, or removal of controlled items. Once an identity device is created, validation and matching of the individual's biometric data to the identity device can be performed at the control point. In preferred embodiments, the type of detector (and even the model) used to detect the fingerprint or other biometric data when creating the tag is used to read the biometric data again from the individual, although other devices could be used.

During operation of a biometric identification system of the invention, the biometric data is read from the ID device and matched to the individual through a comparison performed by software. This means that the validation process does not typically require access to any remote or centrally located database containing volumes of individual's biometric data (although such access is not precluded and could be included). Only the identity device, the individual's correct biometric data, and the RFBID system are needed for validation. Once positive validation is performed, no record of the personal data has to be kept for any purpose by the RFBID system; however, should an unauthorized attempt be made to use the device, the action described in the following item will take place if so desired.

The biometric identification system can have an adjustable level of required matching. In a fingerprint example and at a high security level, the entire fingerprint would have to match with little deviation. At a lower security setting, portions would need to match or be within a threshold. In the case of a fingerprint, a person could have a cut or swelling that could make the match more difficult. The system allows a comparison between portions of the data, and a match can be made if data regions match. The settings can be based on a number of factors, such as individual desires of the owner, security needs, or the level of other supervision over the system.

When an individual's biometric data cannot be matched to the encrypted, compressed binary identity device data file, a "flag" can be set wirelessly on the identity device via the RFBID system. If the individual retries successfully, the flag is wirelessly reset. If the individual retries unsuccessfully, the flag count is incremented on the identity device via the RFBID System. After a predetermined number of counts are set, the device can marked as "compromised" and the device may be seized or other means of authorization can be performed manually. The RFID technology that sets the flag wirelessly is typically provided on all RFBID systems in a biometric identification system; therefore, if an individual attempts subsequent tries at other locations of RFBID systems, such as at different banks, stores, or other control points, the second or other RFBID system will recognize that the flags that have been previously set and take appropriate action. Should a valid match occur at any location, all previously set flags are reset on the ID device.

Identity theft is a crime in the United States. An optional embodiment of the system of the invention exists that enables the RFBID system to wirelessly capture an individual's biometric data upon a preset number of unauthorized tries, along with the date, time and location of the reader. This data can be made available to the authorities in the event that legal action is taken.

Identification device characteristics are RFID technology dependent, which means that the devices are not subject to being destroyed or altered by magnetic fields. The distance between the identity device and the RFBID identity reader or RFBID system may be adjustable and/or may vary to practice the invention; however, a likely case is a distance of three to six inches; although distances of up to ten to fifteen feet or more are achievable in certain circumstances. Shorter distances can help prevent the detection of multiple identification devices at one time.

Significantly, the ID device does not require swiping or insertion into a read device. Most embodiments of the invention do not require Personal Identification Codes (PIN numbers), passwords or roving authentication keys, all which can be compromised (e.g., by shoulder surfing); however, the RFBID system has the capability to interact with existing systems by providing optional built-in keypads, card swipe or proximity detection for further identification purposes. How an individual presents their finger to a fingerprint reader can also cause problems with image matching. Some embodiments of the RFBID system have the ability to read a fingerprint without regard to specific orientation, which significantly increases the ability to successfully capture the fingerprint on the initial attempt. The RFBID encoder portion of the RFBID system uses an optical quality scanner that captures more of the individuals fingerprint than most normal fingerprint readers, which in turn, provides better identification potential. Other biometric features are treated in a manner similar to the fingerprint.

Figure 5:
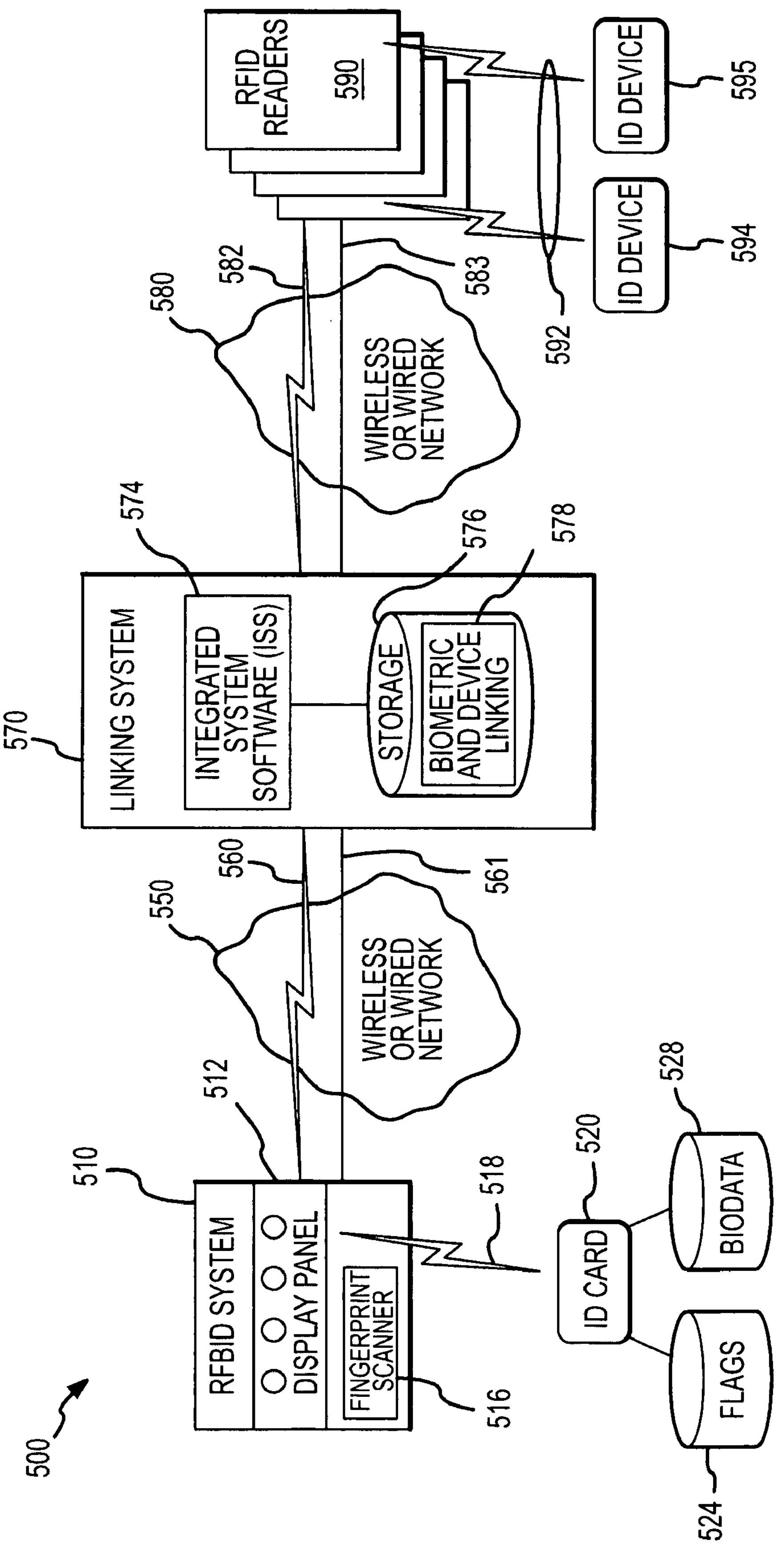

FIG. 5 illustrates another biometric identification system 500 that may be used to integrate an RFBID system 510 with non-biometric RFID systems shown as RFID readers 590 (in this example) that use RF signals to 592 to read from ID devices 594, 595. As shown, the system 500 includes an RFBID system 510 with a display panel 512 and a fingerprint scanner 516 that communicates via RF signals 518 with ID cards 520 that store flags 524 and biodata 528. The RFBID system 510 communicates also with a linking system 570 via signals 560 or 561 over network 550. The linking system includes integrated system software 574 and storage 576 for storing biometric and device linking data 578. The linking system 570 in turn communicates via network 580 and signals 582 or 583 with RFID readers 590 (or other non-biometric RFID systems, not shown).

This integration capability links biometric identification (i.e., the holder of the ID device 520) to RFID-tagged items that do not have biometric features 594, 595 (baggage, computers, chemicals, firearms, and the like). The removal of the biometric reader portion of the RFBID system converts the biometric system to a low cost, multi-protocol, interactive RFID system 590 that integrates seamlessly with the biometric system.

The RFBID system 510 can be programmed to write specific reference indicators to the RFBID device 520. The reference indicators can then be used by the RFBID identity reader to complete an authentication process. An example of the use of this closed-loop capability is for airline security. The RFBID identity reader 510 can be programmed to write the three-letter airport code onto the individual's RFBID device 520, in addition to performing its standard authentication functions. The RFBID device 520 can support a "revolving" written capability, meaning that as the individual travels from airport-to-airport each three-letter airport code will be written wirelessly to the RFBID device. Depending on the memory capacity of the RFBID tag, dozens of three letter airport codes, plus a time and date stamp, can be written wirelessly to the RFBID device 520.

To close the security loop, once the RFID device 594, 595 or RFBID device 520 is presented by an individual traveler to an identity reader 510 or 590, if any of these devices 520, 594, 595 contains one of the "flagged" airport codes, the identity reader's 510, 590 standard notification protocols will engage, thereby notifying the appropriate security personnel.

While much of the processing described above for the RFBID systems can be done by software in a general purpose processor, such as a microprocessor, or with another type of processor such as a field programmable gate array (FPGA) for some tasks, processing can be performed in hardware or in a combination of hardware and software, such as with an application specific integrated circuit (ASIC).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A biometric identification system, comprising:

an identification device comprising a radio frequency identification (RFID) element storing a first set of biometric information; and an identification system comprising:

a communication device using radio frequency signals to read the first set of biometric information from the identification device when the identification device is proximal to the identification system, a biometric reader reading a second set of biometric information from an individual, and a comparison mechanism comparing the first set of biometric information to the second set of biometric information to determine if the two sets of biometric information are a match, the identification system incrementing a counter value in the RFID element of the identification device when the two sets of biometric information are determined not to match by the comparison mechanism.

2. The system of claim 1, wherein the communication device reads the first set of biometric information without physical contact between the communication device and the identification device.

3. The system of claim 1, wherein the identification system determines the counter value prior to performing the comparing and only performs the comparing when the counter value is below a preset limit.

4. The system of claim 1, wherein the identification system further comprises an update mechanism operable to determine when the match between the first set of biometric information and the second set of biometric information is within tolerance but outside a predefined match accuracy limit and to update the first set of biometric information by writing the second set of biometric information to the RFID element via radio frequency signals sent by the communication device.

5. The system of claim 1, wherein the RFID element further stores a card identifier number and wherein the communication device reads the card identifier number and the comparison mechanism determines if the identification device is a valid device by determining whether the read card identifier number matches a number in a set of valid card numbers accessible by the identification system.

6. A radio frequency biometric identification system, comprising:

a biometric reader reading biometric information from an individual based on scanning a physical feature of the individual;

a data writer formatting the read biometric information and with radio frequency signals writing the formatted biometric information to a radio frequency identification (RFID) tag provided on an identification device;

a comparison mechanism comparing a set of read biometric information from the biometric reader matches a set of biometric information obtained from the identification device; and a flag mechanism incrementing a counter value encoded in the RFID tag using a radio frequency signal when the comparison mechanism determines the two sets of biometric information do not match.

7. The system of claim 6, further comprising a proximity reader using radio frequency signals for reading the set of biometric information from the identification device without requiring insertion of or contact with the identification device.

8. The system of claim 6, wherein the comparison mechanism compares the counter value of the RFID tag with a preset counter flag value limit prior to performing the biometric information comparison.

9. The system of claim 6, further comprising an update mechanism operable to determine when the match between the match between the two sets of biometric information is outside a predefined match accuracy limit and to write the set of read biometric information to the RFID tag via radio frequency signals.

10. A biometric identification method, comprising:

activating a biometric identification card including first scanning a biometric feature of a person and writing biometric information from the scanning into a radio frequency identification (RFID) element embedded in the biometric identification card;

without insertion or contact, reading the biometric information from the RFID element;

second scanning a biometric feature of a person presenting the biometric identification card as part of an access transaction to obtain a comparison set of biometric information;

determining whether the comparison set of biometric information is a match of the read biometric information from the RFID element of the biometric identification card; and incrementing a counter value on the RFID element by transmitting a radio frequency signal to the biometric identification card when there is no match between the comparison set of biometric information and read biometric information.

11. The method of claim 10, wherein the determining of a match comprises determining whether the comparison set of biometric information matches the read biometric information within a preset accuracy percentage.

12. The method of claim 10, further comprising after the determining of a match, when there is a determined match determining whether an update of the read biometric information is to be updated and when an update to be made is determined, updating the read biometric data by writing the read biometric information into the comparison set of biometric information to the RFID element of the biometric identification card.

13. The system of claim 1, wherein the counter value is incremented to a value of 2 or greater.

14. The system of claim 1, wherein the counter value is reset to zero if a successful match is determined by the comparison mechanism.

15. The system of claim 1, wherein the comparison mechanism utilizes an adjustable level in determining whether a match exists, the adjustable level being set based on the level of security desired for the system.

16. The system of claim 1, wherein the identification system further includes a data collector collecting biometric data if more than a predetermined number of attempts to use the identification device are found not to match and a reporting unit to notify authorities of the attempts and the biometric data collected during the attempts.

17. The system of claim 6, wherein the counter value is incremented to a value of 2 or greater.

18. The system of claim 6, wherein the counter value is reset to zero if a successful match is determined by the comparison mechanism.

19. The system of claim 6, wherein the comparison mechanism utilizes an adjustable level in determining whether a match exists, the adjustable level being set based on the level of security desired for the system.

20. The system of claim 6, wherein the identification system further includes a data collector collecting biometric data if more than a predetermined number of attempts to use the identification device are found not to match and a reporting unit to notify authorities of the attempts and the biometric data collected during the attempt.

21. The system of claim 10, wherein the counter value is incremented to a value of 2 or greater.

22. The system of claim 10, wherein the counter value is reset to zero if a successful match is determined by the comparison mechanism.

23. The system of claim 10, wherein the comparison mechanism utilizes an adjustable level in determining whether a match exists, the adjustable level being set based on the level of security desired for the system.

24. The system of claim 10, wherein the identification system further includes a data collector collecting biometric data if more than a predetermined number of attempts to use the identification device are found not to match and a reporting unit to notify authorities of the attempts and the biometric data collected during the attempts.

* * * * *